United States Patent [19]
Moller

[11] 3,960,036
[45] June 1, 1976

[54] TORQUE CONVERTER

[75] Inventor: Paul S. Moller, Dixon, Calif.

[73] Assignee: Discojet Corporation, Davis, Calif.

[22] Filed: Mar. 26, 1975

[21] Appl. No.: 562,014

[52] U.S. Cl. .................................. 74/802; 74/394; 74/752 F
[51] Int. Cl.² ...................... F16H 1/28; F16H 35/02
[58] Field of Search ............ 74/393, 394, 797, 801, 74/802, 803, 752 F

[56] References Cited
UNITED STATES PATENTS

| | | |
|---|---|---|
| 3,177,738 | 4/1965 | Achilles .......................... 74/752 F X |
| 3,447,398 | 6/1969 | Chen ................................. 74/752 F |
| 3,540,310 | 11/1970 | Preston .............................. 74/752 F |
| 3,722,325 | 3/1973 | Rogers ............................ 74/752 F X |
| 3,728,911 | 4/1973 | Granville .......................... 74/752 F |

*Assistant Examiner*—Lance W. Chandler
*Attorney, Agent, or Firm*—Lothrop & West
*Primary Examiner*—Samuel Scott

[57] ABSTRACT

A torque converter for inclusion between a driving shaft and a driven shaft has a driving gear rotatable about a primary axis and in mesh with planetary gears rotatable about second axes parallel to the primary axis. The planetary gears are coupled to eccentric weights also rotatable about the secondary axes in a predetermined phase relationship. The planetary gears and weights are coupled to a driven gear with which there may be selectively meshed either one of a pair of pinions. Each pinion is provided with a unidirectional clutch engagable with a torque shaft having limited rotation and essentially fixed. The clutches work in opposite directions. Preferably, both the driving shaft and the driven shaft, as well as the torque shaft, are provided with torque cushions to smooth out variations in torque. Special inertia relationships are maintained.

8 Claims, 3 Drawing Figures

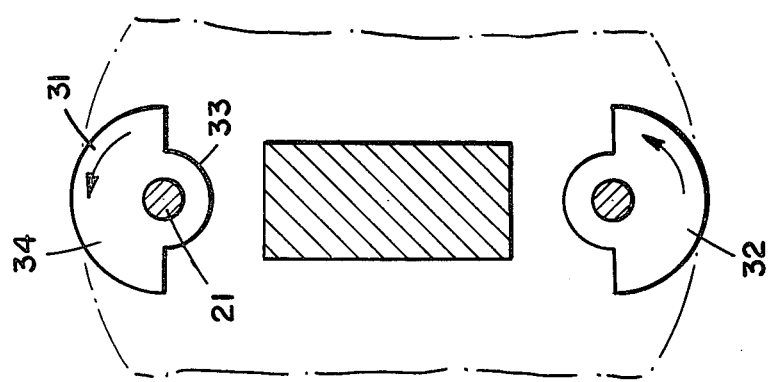
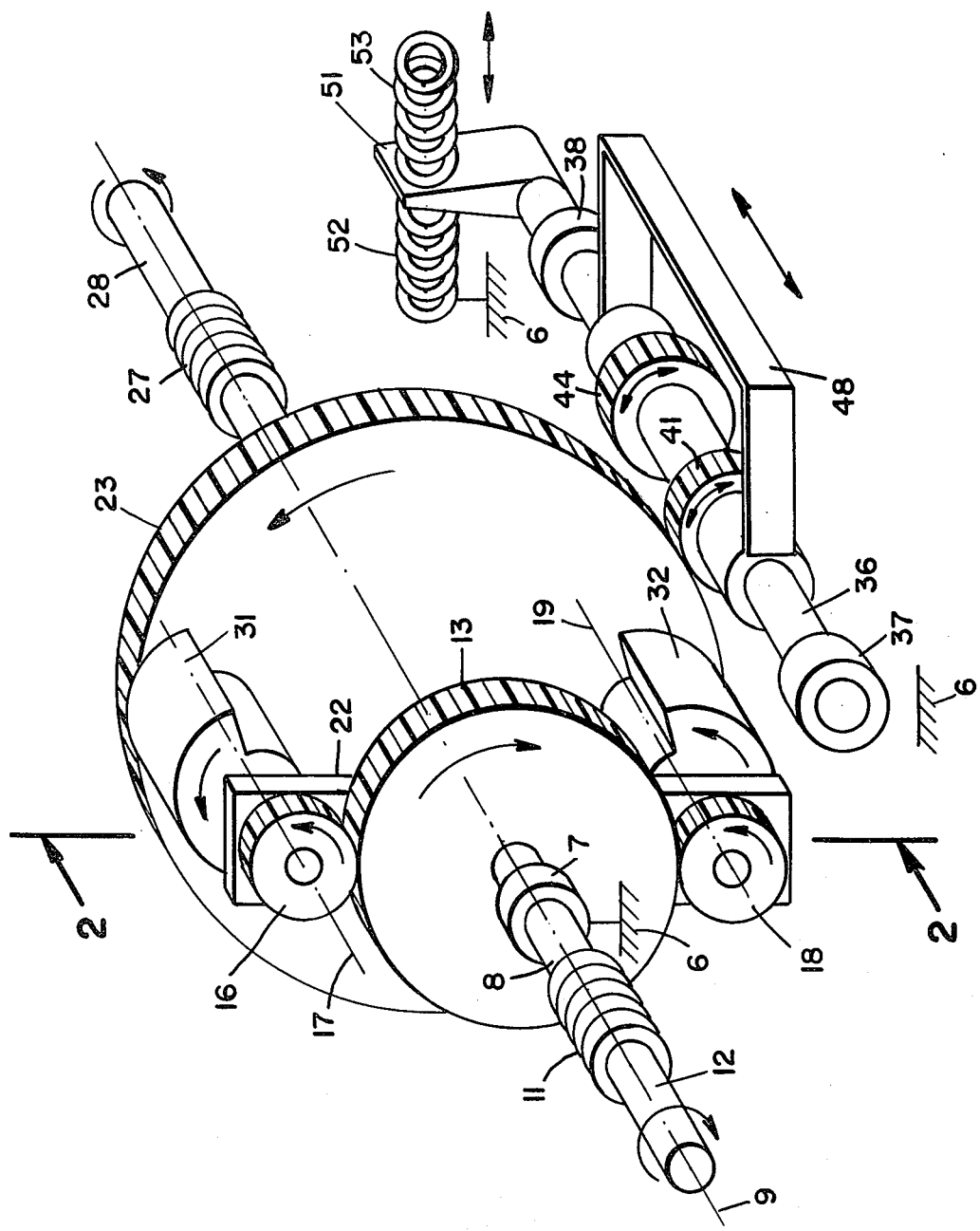

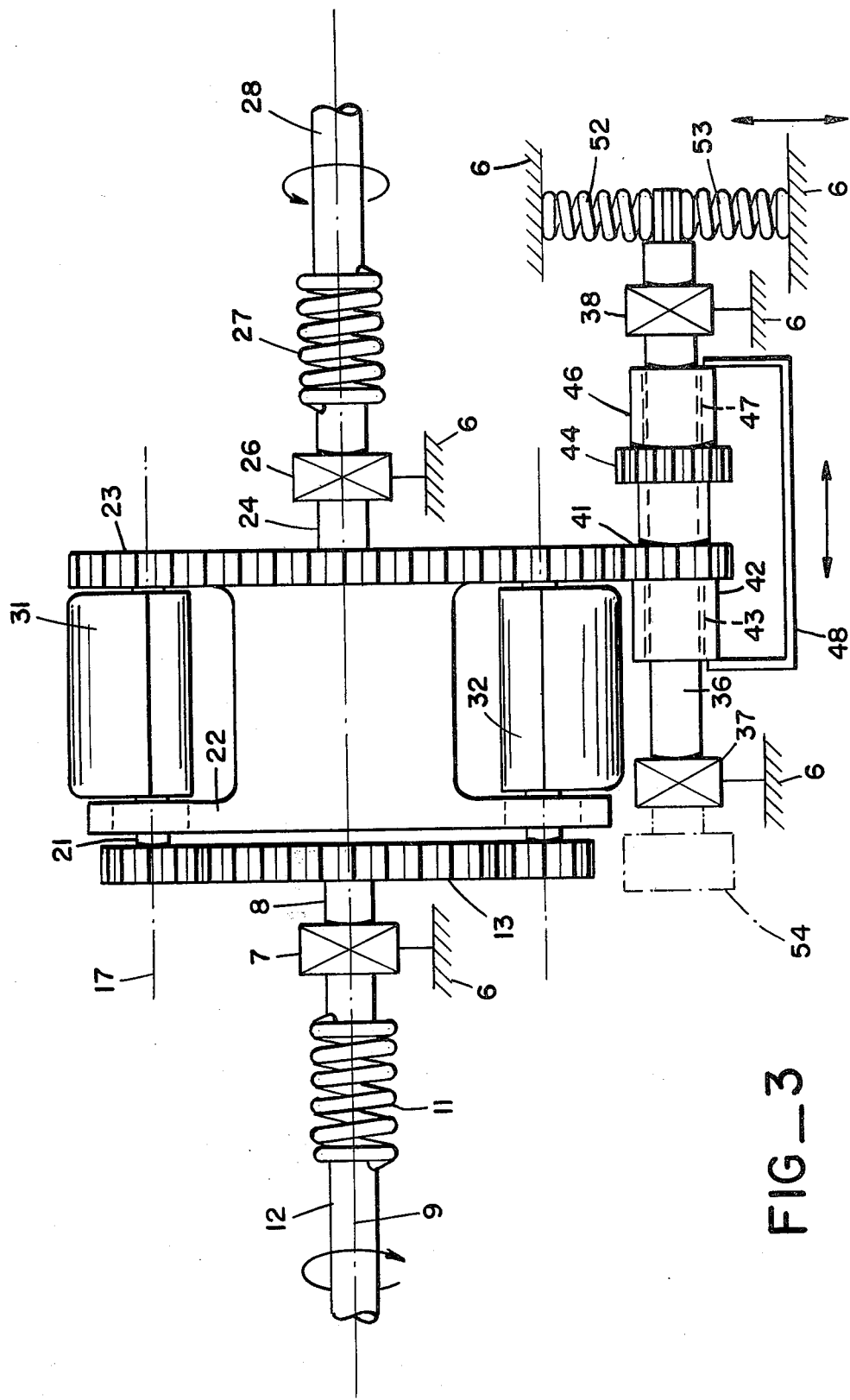
FIG_3

TORQUE CONVERTER

In rotary machinery there is very often a requirement for accepting torque at an input and in some fashion transforming the torque to a more suitable value for the output of the mechanism. For example, a relatively high speed driving shaft can be coupled to a relatively low speed driven shaft with an appropriate torque multiplication therebetween. There are various devices for doing this, both unidirectional and bidirectional, but many of them are complex or involved.

It is therefore an object of the present invention to provide a relatively effective but simple torque converter that can be interposed between a driving shaft and a driven shaft to perform the desired torque conversion between them.

A further object of the invention is to provide a torque converter that is effective not only to vary torque between a driving shaft and a driven shaft, but likewise to effectuate a reversal in direction of rotation between such shafts.

A further object of the invention is to provide a torque converter that is made up of well-known and generally acceptable mechanical elements.

A further object of the invention is to provide a torque converter that is smooth and relatively continuous in its torque conversion and is without unnecessary or excessive vibration or interruptions in torque transmission.

A further object of the invention is to provide a torque converter that can be easily adapted to transmit varying amounts of power and can be incorporated in various different sizes without difficulty.

A further object of the invention is in general to provide an inproved torque converter.

Other objects, together with the foregoing, are attained in the embodiment of the invention described in the accompanying description and illustrated in the accompanying drawings, in which:

FIG. 1 is an isometric perspective view showing diammatically a torque converter constructed pursuant to the invention;

FIG. 2 is a detailed view in cross-section, the plane of which is indicated by the line 2—2 of FIG. 1, portions of the mechanism being omitted or broken away for clarity; and FIG. 3 is a side elevation of the structure illustrated in FIG. 1, certain items being shown diagrammatically and other portions being omitted for clarity.

While the torque converter pursuant to the invention can be embodied in a large number of different ways, it has with success been incorporated in the form illustrated herein. In the illustration, it is assumed that there is a casing or foundation or housing represented by the conventional element 6. The frame or casing is substantially stationary with respect to the remaining parts of the structure and is stiff enough to serve as a base and usually is extensive enough to serve as an enclosure.

The housing 6 contains a bearing structure 7 of any appropriate sort effective to hold a driving shaft 8 in rotational position about a primary axis 9. Designed to smooth or cushion the input to the mechanism and incorporated with the driving shaft 8 is a cushion 11. This is in the form of a helical spring at opposite ends fastened to the driving shaft 8 and also to an input shaft 12 concentric with the axis 9 and imparting torque to the mechanism. The spring 11 allows slight phase differences between the shaft portions 8 and 12, while still transmitting the desired torque.

Mounted on the driving shaft 8 and rotatable therewith concentric with the axis 9 is a driving gear 13. Meshing with the driving gear 13 is a first planetary gear 16 rotatable about a secondary axis 17 parallel to the primary axis 9 and radially spaced therefrom. The first planetary gear 16 can be supplemented by one or more additional planetary gears, such as 18, themselves mounted on one or more additional axes 19 parallel to the axis 9 and radially spaced therefrom. The number of additional planetary gears 18 can vary as desired. In a simple instance, as illustrated, the additional planetary gear 18 is a second gear and, being equally spaced polarly, is opposite to the first planetary gear 16.

The gear 16 not only meshes with the gear 13, but is mounted on a planetary shaft 21 journalled in a frame 22 forming part of a large driven gear 23 concentric with the axis 9. The driven gear 23 is fixed to a driven shaft 24 mounted in a bearing 26 in the housing 6. The shaft 24 is connected through a second cushion 27. A helical spring is fastened not only to the driven shaft 24 but likewise to a coaxial output shaft 28 delivering the converted torque to any suitable torque-using device.

The frame 22, fastened onto or integral with the driven gear 23, is in effect a yoke so that the shaft 21 is well supported at the two bearing points. Carried between such bearing points is an eccentric weight 31 duplicated by another, opposite eccentric weight 32 with a similar mounting and driven by the planetary gear 18.

As especially shown in FIG. 2, the weight 31 on the shaft 21 is arranged with a relatively small, shaft engaging half-hub 33 and with a relatively large, shaft engaging half-hub 34. With respect to the secondary axis 17, the weight is eccentric and the eccentricity has a known phase or polar position. The additional weight 32 is virtually a duplicate of the weight 31 but is mounted with a known phase relationship to the weight 31. In this instance, the weights turn at the same speed and in the same direction about their axes 17 and 19 and with their eccentricities always at equal radii from the axis 9.

The driven gear 23 is provided with means for governing its rotation. In the present instance, there is provided a torque shaft 36 mounted for rotation of a limited sort in bearings 37 and 38 in the housing 6. Arranged for axial sliding movement on the torque shaft 36 is a first pinion 41 designed to mesh with the driven gear 23 and carrying a case 42 within which a unidirectional clutch 43 is mounted. The unidirectional clutch is effective to couple the pinion 41 to the torque shaft 36 in one direction of rotation only. Similarly, on the torque shaft 36 there is provided a second pinion 44 adapted in one position to engage the driven gear 23 and itself carrying a case 46 within which is a second unidirectional clutch 47 effective to couple the pinion 44 to the torque shaft 36 for one direction of rotation opposite to the coupling direction of the clutch 43.

Both of the gears 41 and 44 and their attendant clutches and cases 42 and 46 are simultaneously movable axially by a shift yoke 48, so that alternatively the pinion 42 or the pinion 44 may be engaged with the driven gear 23.

Since it is desired to cushion the torque effect on all of the shafts, the torque shaft 36 itself is provided with a radial arm 51 (shown in different polar positions in FIGS. 1 and 3 for clarity of illustration). The arm 51 is fastened on the torque shaft 36 and is held between two cushion springs 52 and 53 abutting stationary parts of the housing 6. The springs 52 and 53 permit some oscillation of a rotary nature by the torque shaft 36 but limit such oscillation to a predetermined amount.

In the operation of this structure, power is put into the shaft 12 in the direction of the indicating arrow; for example, clockwise in FIG. 1. The rotation of the input shaft 12 is preferably as continuous as possible, although there may be some intermittency or time variation therein which is smoothed out or damped or cushioned by the spring 11. The rotation of the shaft 12 is thus transmitted rather smoothly to the driving shaft 8 and so rotates the driving gear 13 correspondingly. As the gear 13 rotates in the indicated direction, it rotates the planetary gear 16 (and the additional planetary gear 18) and so rotates the unbalanced weight 31 about the axis 17 and the unbalanced weight 32 about its axis 19.

If the driven gear 23 were completely free to rotate about the axis 9, the entire described assembly would oscillate as a unit without transmitting any amount of torque. However, the driven gear 23 is not always free to rotate. In fact, in one direction of rotation it is held by its interengagement with the pinion 41, for example. For that direction, the pinion 41 is locked by the unidirectional clutch 43 to the torque shaft 36. While the shaft 36 can rotate slightly due to the resiliency of the springs 52 and 53, it cannot rotate very much, and so in effect holds the driven gear 23 stationary for one direction of rotation. In the other direction of rotation, the driven gear 23 is free to revolve since the pinion 41 is free to turn on the torque shaft 36 because of the release of the unidirectional clutch 43 in that direction.

When the planetary gear 16 rotates, it rotates the weight 31 with it. As the weight rotates, it alternately provides a rotating unbalanced force. At one time in its rotary cycle, the unbalanced force has a tangential component in the desired direction of rotation of the driven gear 23 and helps that gear so to turn. At a subsequent time in its rotary cycle, the unbalanced force has an opposite tangential component that opposes turning of the gear 23 in the desired direction. But that direction of turning is blocked by engagement of the previously free clutch 43 to preclude retrograde motion.

The same effect is derived cumulatively from the unbalanced weight 32. This has a phase relationship to the unbalanced weight 31, so that the tangential components in one direction from both unbalanced weights are additive. These periodic tangential components thus are repeatedly effective to transmit force in successive opposite directions to the driven gear 23. If this gear is locked by the clutch for one direction, the gear is not turned in that direction due to the imposed force, but if the gear 23 is free then to turn, it receives torque in the free turning direction.

The transfers of torque from the rotating weights, being intermittent, are cushioned by the springs 51 and 53, and likewise the driven shaft 24 in acting through the spring cushion 27 imparts a smoothed output torque to the output shaft 28.

The foregoing operation is unidirectional, but, if a reverse is desired, then the operator shifts the yoke 48 to remove the pinion 41 from engagement with the driven gear 23 and to put out of operation its one-way unidirectional clutch 43. He moves the other pinion 44 into mesh with the driven gear 23, thus activating the other unidirectional clutch 47, which is effective in the reverse or opposite direction. After the shaft has been effectuated, the direction of rotation of the driven shaft 28 is opposite to what it was theretofore, but the torque conversion characteristics are as previously described, only the direction of rotation being reversed.

Since the number of impulses in the driving direction is dependent upon the relative speed between the driving shaft and the driven shaft, the torque conversion varies with the relative speed of those shafts. In the event only a small amount of output torque is required, a given amount of input power produces a relatively high output shaft speed. If a large amount of output torque is required, then the same amount of input power produces a relatively low output shaft speed. This is because each of the unbalanced weights 31 and 32 transmits a given impulse (force times distance) to the frame 22 for each revolution of the weight. When the frame is rotating fast the corresponding distance traveled in a unit time is great so the related force is small. Also when the frame 22 is rotating slowly the corresponding distance traveled in the unit time is small so the related force is great. Thus, as the load on the output shaft changes the torque supplied to that shaft changes accordingly in a continuous, smooth and highly efficient manner.

In a practical device proportioned about as shown herein and made of substantially the same materials throughout, it has been found that to obtain optimum response of the torque converter to changes in displacement of the spring group 52 and 53 it is desirable that the torque shaft 36 and the radial arm 51 have a moment of inertia approximately 5% of the moment of inertia of the system including the elements 16, 22, 31 and 32, and 13. In the vicinity of this ratio, the output rotational speed is very nearly a rectilinear function of the displacement of the spring group 52 and 53. That is, for a very small moment of inertia of the torque shaft 36 the output speed of rotation rises very quickly with spring displacement, but in the vicinity of the 5% ratio the output shaft speed rises almost linearly with spring displacement. If a substantially linear relationship is desired and the moment of inertia of the shaft 36 is below the 5% ratio, as is often the case, then the moment of inertia can be brought to the desired ratio by the addition to the shaft 36 of a symmetrical weight 54, as shown in dotted lines in FIG. 3.

What is claimed is:

1. A torque converter comprising a driving gear rotatable about a primary axis, a driven gear rotatable about said primary axis, a first planetary shaft mounted on said driven gear coaxially with a secondary axis parallel to and radially spaced from said primary axis, a first planetary gear rotatable about said second axis and meshing with said driving gear, a first weight eccentric to and rotatable around said secondary axis, means for coupling said first weight and said first planetary gear for rotation together, a torque shaft, means for mounting said torque shaft for limited rotation, a first pinion engagable with said driven gear, and a first unidirectional clutch connectable to said torque shaft and said first pinion.

2. A device as in claim 1 including a driving shaft, and a first torque cushion interposed between said driving shaft and said driving gear.

3. A device as in claim 1 including a driven shaft, and a second torque cushion interposed between said driven shaft and said driven gear.

4. A device as in claim 1 including a second pinion engageable with said driven gear, and a second unidirectional clutch connectable to said torque shaft and said second pinion.

5. A device as in claim 4 in which said first unidirectional clutch and said second unidirectional clutch operate in opposite directions.

6. A device as in claim 5 including means for engaging said first pinion and said second pinion with said driven gear alternatively.

7. A device as in claim 1 including an additional planetary shaft mounted on said driven gear coaxially with a tertiary axis parallel to and radially spaced from said primary axis, an additional planetary gear rotatable about said tertiary axis and meshing with said driving gear, an additional weight eccentric to and rotatable around said additional axis, and means for coupling said additional weight and said additional planetary gear for rotation together.

8. A device as in claim 7 in which said first weight and said additional weight have a predetermined phase relationship to each other.

* * * * *